ical use. Further, in U.S.
United States Patent Office 3,464,928
Patented Sept. 2, 1969

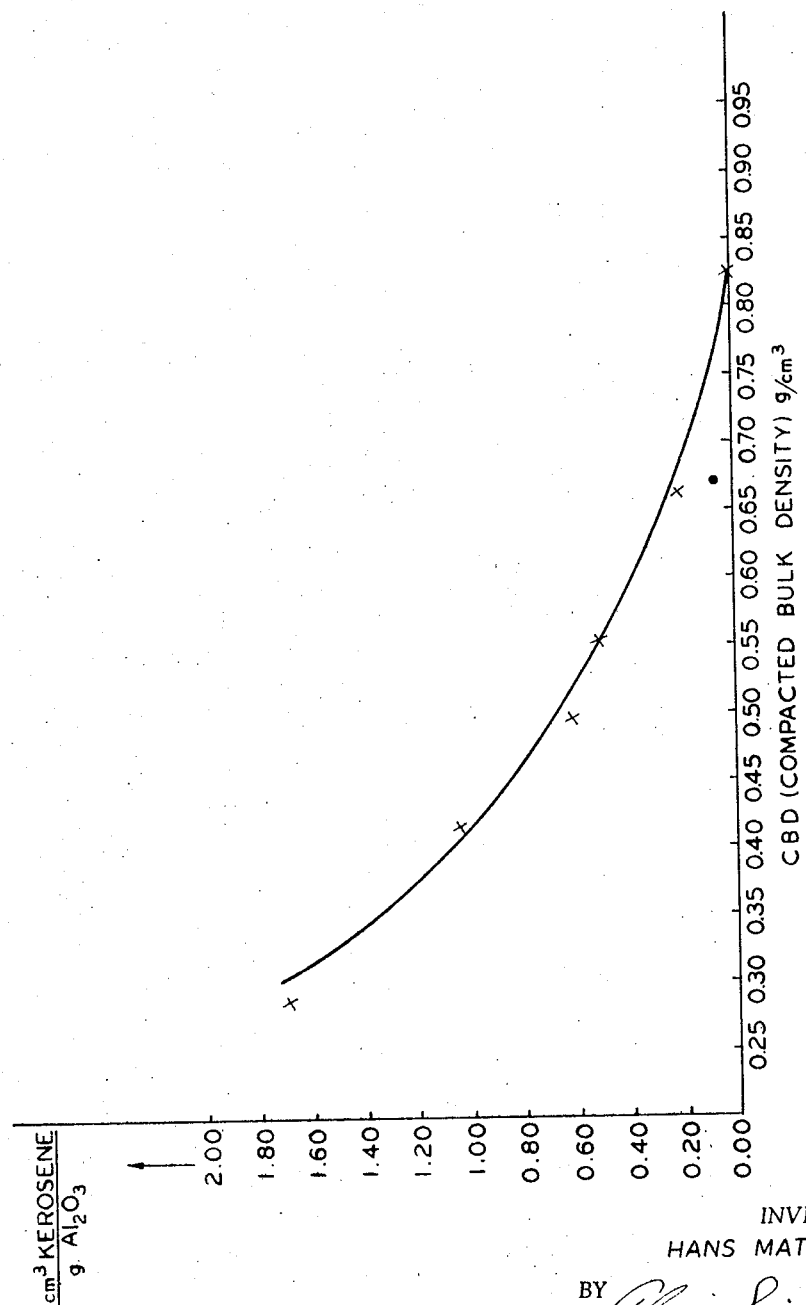

3,464,928
PROCESS FOR FORMING REFRACTORY-OXIDE-CONTAINING GEL BEADS
Hans Mathies, Amsterdam, Netherlands, assignor to Koninklijke Zwavelsuurfabrieken Voorheen Ketjen N.V., Amsterdam, Netherlands, a limited-liability company of the Netherlands
Filed July 12, 1966, Ser. No. 564,635
Claims priority, application Netherlands, July 13, 1965, 6508991
Int. Cl. B01j *11/44, 11/16;* C10g *35/04*
U.S. Cl. 252—441
15 Claims

ABSTRACT OF THE DISCLOSURE

In the process for producing hydrogel beads by forming drops of a gelable hydrosol of an inorganic oxide in air above a body of water-immiscible liquid through which the drops pass so as to be formed into spheroidal globules before passing into an underlying body of an aqueous coagulating medium where the sol globules are coagulated to firm hydrogel beads and which may contain a surfactant to reduce the surface tension of the interface between the water-immiscible liquid and the aqueous coagulating medium, a water-immiscible liquid, such as, kerosene, benzene, carbon tetrachloride, vaporizing oil or mixtures thereof, is dispersed in the hydrosol with the aid of a substantially water-insoluble emulsifier consisting of an ethoxylated organic compound containing a number of polyoxy ethylene groups equal to ½ to ⅙ the number of carbon atoms in the chain of such organic compound, whereby to obtain relatively low-density hydrogel beads with a very uniform distribution of pores therein and with a relatively high crushing strength.

The process can be modified to include catalytic agents in the beads. For example, finely divided molybdenum oxide can be added to the hydrosol along with the water-immiscible liquid and emulsifier and the firm hydrogel impregnated with cobalt salt to form a disulphurizing catalyst. Also, the firm hydrogel can be subjected to acid extraction followed by impregnation with platinum and a halogen to form a reforming catalyst.

---

The invention relates generally to a process for producing a hydrogel comprising refractory oxide in the form of spheroidal particles having smooth surfaces and to the shaped particles or beads obtained by such process. More particularly, the invention relates to improvements in a process of the type wherein spheroidal refractory-oxide-containing gel particles or beads are formed by dripping a hydrosol, containing refractory-oxide as the predominating oxide, into a body of a water-immiscible liquid above a body of a coagulating medium, whereby the hydrosol is broken up into drops which assume spheroidal shapes in passing through the water-immiscible liquid and then are coagulated to firm spheroidal hydrogel beads or pellets in the coagulating medium.

Processes of the type described above are known. Thus, in U.S. Patent No. 2,492,167 it is proposed to extrude aluminasols into a water-immiscible fluid to form globular particles which are conducted into a coagulating medium to convert them into firm hydrogel pellets having spheroidal shapes and smooth surfaces. The water-immiscible fluid may be any liquid or combination of liquids which is immiscible with water, such as, for example, hydrocarbon oils, petroleum naphtha, kerosene, carbon tetrachloride, and the like. The coagulating medium may be any liquid capable of inducing gelation, such as, for example, aqueous solutions of ammonia, ammonium carbonate, ammonia with solutions of inert salts like ammonium nitrate, ammonia with solutions of catalytic materials with which it is desired to impregnate the alumina-gel, and the like. In general, any alkaline solution containing ammonium ions is suitable for use as the coagulating medium.

Particles obtained by the process of the above-mentioned United States patent have a disadvantageously high CBD (Compacted Bulk Density) which, after drying and calcining, lies between 0.8 and 0.9 g./cm.$^3$ for particles with a final diameter of 1.0 to 2.0 mm. An important use of such spheroidal particles is as a carrier for catalytically active metals or metal compounds, whereby the particles carrying such active metal compounds can be employed as catalysts, for example, in the mineral oil industry for effecting conversions. Since the catalyst column must be filled to a certain height, a carrier material with a high CBD results in a greater mass of carrier in the column than a carrier material with a lower CBD. Thus, for economic reasons, it is disadvantageous to use a carrier material with a high CBD. Another advantage of a carrier material with a lowered CBD is the higher porosity of the particles. Of course, the CBD of the carrier material cannot be too low, as the increased porosity of such materials causes a reduction in the abrasion and/or crushing strength. Thus, it is desirable to provide a process, in which the CBD of the resulting particles or beads can be adjusted to a predetermined value by choice of the reaction conditions while preserving the highest possible crushing strength.

The above mentioned United States patent apparently recognized the disadvantages of the high CBD and for that reason, in column 3, lines 55 to 66, it is suggested that a gas, such as air, or a solid, such as dried gel, be dispersed in the sol, but this suggestion has not been practically developed for commercial use. Further, in U.S. Patent No. 2,384,945 it is suggested to occlude a liquid, gas or combustible solid in the hydrosol to cause large pores to occur in the finished spheroidal beads or particles after drying, burning or other suitable treatment. However, it is disclosed that, when gas or vaporizing oil was dispersed in a silica sol with a gelation time longer than one hour, the dispersed liquid showed a tendency to move to the globule surface and be lost. Thus, only slight dispersions of the vaporizing oil may remain only at the surface of the spheroidal hydrogel particles which are therefore not homogeneous.

Surprisingly, it now has been found that uniform hydrogel beads or particles of controlled CBD can be obtained by including an oil-soluble, substantially water-insoluble emulsifier in the dispersion of the hydrosol and a water-immiscible liquid and by dripping the thus obtained stable and superior dispersion, in which the globules of the water-immiscible liquid are of the same size and are uniformly distributed, into the organic phase after passage through an air space. The presence of the oil-soluble, substantially water-insoluble emulsifier facilitates the dispersion of the water-immiscible liquid in the hydrosol. The size of the final beads is very uniform, as the forming of the drops in air gives more uniform drops than when the sol is extruded directly into the liquid organic phase.

The remainder of the process may proceed substantially in the same way as described in the above identified United States patents. The drops formed in air are shaped in the liquid organic phase and gelatinize in the coagulating medium and, thereafter, can be dried and calcined in entirely the same way as the known particles, but the finally obtained spheroidal particles have a lower CBD. According to the precess embodying this invention, the CBD of the final particles can be held to a desired value by selection of the amount of the water-immisible liquid dispersed in the hydrosol. For example, the present invention makes it possible to obtain spheroidal particles having a CBD value between 0.29 and 0.92 g./cm.³ for aluminum oxide coagulated in ammonia.

If aluminum oxide hydrosols are used as the raw material, these can be obtained in widely different ways. In general, concentrations of 5 to 15 percent, by weight, of $Al_2O_3$ in the hydrosol are most suitable. For example, the starting or raw material may be a hydrosol obtained according to the process disclosed in U.S. Patent No. Re. 22,196, and in which aluminum metal in granulated shape is converted into an aluminum oxide hydrosol with the aid of a solution of 1 percent, by weight, of acetic acid, to which a small amount of mercury nitrate has been added.

Fair results are also obtained with a hydrosol prepared according to Example 1 of Dutch Patent No. 76,445, if diluted to a $Al_2O_3$ content of 10 percent, by weight.

However, it is preferred to use a hydrosol that has been prepared by peptizing an aluminum oxide obtained by topochemical conversion of soild ammonium alum, that is aluminum ammonium sulfate or $AlNH_4(SO_4) \cdot 12H_2O$, with concentrated ammonia in acetic acid, hydrochloric acid (muriatic acid) or nitric acid. A preferred viscosity of the hydrosol is obtained with a concentration of about 7 percent, by weight, of $Al_2O_3$. The piptization is effected by heating to about 70° C., while stirring, $Al_2O_3$ and water in the pressence of the acid and maintaining this temperature until a hydrosol is obtained while continuously keeping constant the pH in the range from about 3.5 to 4.5. Thus, if acetic acid is used as the peptizing acid, the total amount of the acid can be added at once to the water, but, when a stronger acid is used, it has to be added gradually in proportions as the reaction proceeds.

The hydrosol obtained, as described above, by peptization with acetic acid, hydrochloric acid or nitric acid of topochemically converted ammonium alum crystal and having a concentration of 7 to 10 percent, by weight, of $Al_2O_3$, results in well-shaped particles when the latter pass through kerosene or another organic liquid. However, the hydrosol obtained according to U.S. Patent No. Re.22,196 is somewhat more stable and has a lower viscosity so that it is desirable to add ammonium acetate thereto until a pH of 6.0 to 6.1 is reached. Approximately 14 g. ammonium acetate is required for each kg. of hydrosol to achieve a pH of 6.0 to 6.1, so long as the hydrosol contains 7 to 10 percent, by weight, of $Al_2O_3$.

The shaping of the drops in the air is preferably effected by means of hollow needles. The size of the drops is dependent on the internal diameter of the needle, and also on the shape, angle of slope and dimensions of the outflow opening.

The temperature at which the drops are formed in air, then shaped in an organic liquid phase and finally coagulated can vary between rather wide limits.

The organic liquid to be dispersed in the hydrosol can be any of a number of very different, water-immiscible, liquids. Liquids having extremely low boiling points are not desirable as the volatility thereof would cause their untimely removal out of the dispersion. Further, liquids having extremely high boiling points should not be used as these can be removed only with difficulty during the final drying and/or calcining operations. Kerosene, benzene, carbontetrachloride, and vaporizing oil as well as mixtures thereof, have been found to be suitable for use as the water-immiscible liquid dispersed in the hydrosol. However, kerosene is particularly preferred as it does not prematurely escape from the dispersion and yet is readily removed from the pores of the spheroidal particles or beads.

The organic liquid layer, wherin the shaping of the drops is accomplished, may also be constituted by any of a number of water-immiscible liquids which also have boiling points that are neither too high nor too low. Moreover, the liquid in which the drops are to be shaped must have a lower specific gravity than the aequeous layer in which coagulation is to be accomplished. Kerosene, benzene, and vaporizing oil, as well as mixtures thereof, are found to be suitable. Carbon tetrachloride can also be used, but only in mixtures having a specific gravity lower than that of the aqueous layer. Generally, aliphates, aromates and halogenated hydrocarbons can be used. However, in order to prevent pollution of the one organic liquid with the other, it is preferred to use the same organic liquid that is dispersed in the hydrosol as the organic liquid medium in which the shaping of the drops takes place. Thus, in a particularly preferred embodiment of the invention, kerosene is dispersed in the hydrosol and kerosene forms the organic liquid layer in which the drops are shaped.

The aqueous phase may contain any coagulating medium capable of causing gelation of the inorganic oxide in the hydrosol. In the case of an aluminasol, any alkaline solution can be used as the coagulating medium. However, to prevent the importation of strange ions, and particularly of Na- or K-ions, an ammonia solution is preferably employed. Residues of ammonia in the particles need not even be washed out, as these disappear spontaneously when the particles are heated during the drying and/or calcining operation. An ammonia concentration of 2 to 10 percent, by weight, in the coagulating aqueous solution is preferred. Furthermore, it is preferred that a water-soluble surfactant be present in the aqueous layer. Extremely good results are obtained with a surfactant in the aqueous layer consisting of p-tert.-octylphenol modified with about 10 ethylene oxide groups per mol.

The spheroidal particles or beads thus obtained can be separated from the coagulating medium immediately after the gelation. If desired, however, the particles or beads can be left in contact with the coagulating liquid, for instance, for a period of 1 to 120 minutes, before separating the beads from the liquid.

The separated particles or beads can now be treated to form catalysts. In manufacturing a platinum- and halogen-containing reforming catalyst, one can start from a hydrochloric acid hydrosol, as above-mentioned, or an acetic acid hydrosol, to which there has been added the halogen and platinum salt, whereby cogelation occurs. Alternatively, the halogen and the chloroplatinic acid can be applied, at the same time, to the coagulated beads. However, it is preferred to add the platinum as late as possible, that is, after drying and/or calcining of the beads, so as to minimize losses of platinum. Thereafter, the treated beads are calcined again.

A particularly active reforming catalyst is obtained by leaching out the calcined alumina beads with hydrochloric acid until a loss of weight of 3 to 20% is obtained, calcining the leached beads and only then applying the catalytically active components, for example, the platinum and the halogen, and finally calcining the catalytic beads again.

Not only platinum, but any other catalytically active metals, can be applied in the form of their oxides or salts. Thus, for instance, Mo, V, Ni, Cr, Co, can be applied. These metal oxides can be applied to the alumina beads, or the metal components can be suspended in the oil to be dispersed in the hydrosol or suspended in the hydrosol itself. Also the metal components can be added, in the form of a solution, to the hydrosol.

The process according to the invention is not restricted to aluminum oxide hydrosol, but can be applied to almost all hydrosols. Thus, for example, ferric oxide hydrosol, in a concentration of 7.5 percent $Fe_2O_3$ and 1.37 percent HCl can be employed as the starting material. Thus, the process is applicable to all oxides which give hydrosols and which are herein referred to as refractory oxides.

The process according to the invention is hereinafter further described with reference to the accompanying drawing graphically illustrating the relationship between the CBD of the produced beads and the amount of water-immiscible liquid dispersed in the hydrosol, and with reference to a number of specific, non-limiting examples.

In FIG. 1, the amount of kerosene dispersed in an acetic acid-aluminum oxide hydrosol (cm.³ kerosene/g. $Al_2O_3$) is plotted as the ordinate, and the CBD of the resulting particles (g./cm.³) is plotted as the abscissa. In all of the instances plotted on FIG. 1, there was included, in accordance with this invention, in the dispersion of kerosene and the hydrosol, approximately 6.7 mg. of an emulsifier per ml. of kerosene, which emulsifier was constituted by a lauryl alcohol modified with approximately 2.2 mols ethylene oxide per mol lauryl alcohol, and which is for the sake of convenience referred to by the abbreviation LAEO-2.2. It will be noted from FIG. 1 that the CBD of the resulting beads or particles are reduced from a maximum value of 0.825, when no kerosene is dispersed in the hydrosol, to a CBD of approximately 0.275, when approximately 1.70 cm.³ kerosene/g. $Al_2O_3$ is dispersed in the hydrosol.

The effect of various water-immiscible liquids dispersed in the hydrosol on the properties of the obtained spheroidal particles is indicated in the following Table 1. In each case, the hydrosol contained 7 percent, by weight, $Al_2O_3$ and 1.5 percent, by weight, acetic acid, and was obtained by peptizing aluminum oxide prepared topochemically from ammonium alum and ammonia. In each case, the amount of the water-immiscible liquid dispersed in the hydrosol was 0.53 cm.³/g. $Al_2O_3$, and the dispersion further contained approximately 6.25 mg. LAEO-2.2 per ml. of the water-immiscible liquid dispersed in the hydrosol.

TABLE 1

| Experiment | (a) | (b) | (c) |
|---|---|---|---|
| Type of water-immiscible liquid dispersed in hydrosol | (¹) | (²) | (³) |
| Boiling range of liquid dispersed, ° C | 100–160 | 150–300 | 250–350 |
| Weight of wet particles in grams | 213 | 213 | 215 |
| Weight of dried particles in grams | 19.5 | 20 | 23 |
| Weight of calcined particles in grams | 14 | 14 | 14.5 |
| Percent dry material in dried particles | 72 | 70 | 63 |
| CBD, g./cm.³ | 0.60 | 0.55 | 0.55 |
| Crushing strength, kg | 1.01 | 2.40 | 2.19 |
| Specific surface, m.²/g | 243 | 241 | 233 |
| Pore volume, cm.³/g | 0.47 | 0.47 | 0.46 |
| Pore diameter, A | 77 | 78 | 79 |

¹ Gasoline.  ² kerosene.  ³ Vaporizing oil.

From Table 1 it is apparent that a standard gasoline having a boiling range of 100 to 160° C. has less effect on the CBD of the final particles or beads than does either kerosene or vaporizing oil (gas oil). This difference may be explained by the relatively lower boiling range of the gasoline. Further, it is apparent that, when kerosene is dispersed in the hydrosol, the major part of the kerosene is removed from the particles during the drying thereof. If a water-immiscible liquid having a somewhat lower end point of its boiling range is dispersed in the hydrosol, it may be possible to evaporate all of such water-immiscible liquid from the particles during the drying thereof.

The following Table 2 indicates the effect, on the crushing strength of the produced beads or particles, of varying amounts of emulsifier included in the dispersion of either vaporizing oil or kerosene in an acetic acid hydrosol containing 7 percent, by weight, $Al_2O_3$ and 1.25 percent, by weight, acetic acid, which hydrosol may be produced as hereinafter described under the heading Hydrosol I.

TABLE 2

| Experiment | Cm.³ vaporizing oil/$Al_2O_3$ in the sol | Cm.³ kerosene/g. $Al_2O_3$ in the sol | CBD (g./cm.³) | Crushing strength (kg.) | Mg. LAEO-2.2/ml. of water-immiscible liquid dispersed |
|---|---|---|---|---|---|
| (d) | 0.4 | | 0.60 | 0.9 | 0 |
| (e) | 0.4 | | 0.56 | 1.9 | 8.5 |
| (f) | 0.4 | | 0.55 | 1.0 | 1.7 |
| (g) | | 0.5 | 0.55 | 1.6 | 6.7 |
| (h) | | 0.5 | 0.56 | 2.8 | 33.5 |

The amount of water-immiscible liquid dispersed in the hydrosol does not have a noticeable influence on the specific surface of the resulting beads or particles, but it does noticeably affect both the pore volume and the pore diameter. Further, as is indicated in the following Table 3, the pore volume, as measured with nitrogen, is more distinctly affected by the dispersion of vaporizing oil in the hydrosol, than by the dispersion of kerosene in the hydrosol.

TABLE 3

Influence of the kind of water-immiscible liquid dispersed in the hydrosol on the specific surface, pore volume and pore diameter

| Experiment | Cm.³ water-immiscible liquid/g. $Al_2O_3$ in the sol | | Mg. LAEO-2.2/ml. water-immiscible liquid | Specific surface (m²/g.) | Pore volume (cm.³/g.) | Pore diameter (A.) |
|---|---|---|---|---|---|---|
| | Vaporizing oil | Kerosene | | | | |
| (i) | | | 0 | 270 | 0.40 | 60 |
| (j) | 0.8 | | 0 | 277 | 0.50 | 72 |
| (k) | 0.6 | | 8.0 | 271 | 0.49 | 72 |
| (l) | 0.5 | | 6.7 | 278 | 0.47 | 68 |
| (m) | 0.4 | | 6.7 | 276 | 0.43 | 63 |
| (n) | | 0.2 | 6.7 | 265 | 0.45 | 68 |
| (o) | | 0.5 | 6.7 | 285 | 0.50 | 70 |
| (p) | | 0.8 | 6.7 | 273 | 0.48 | 70 |
| (q) | | 1.0 | 6.7 | 267 | 0.48 | 72 |

Although LAEO-2.2 has been employed as the emulsifier in each of the experiments (a)–(q) appearing in Tables 1, 2 and 3, other emulsifiers may be employed for the stated purpose. In fact, any oil-soluble, substantially water-insoluble emulsifier is suitable provided that it has an HLB (hydrophilic-lyophilic-balance) number, as determined by the method described in the publication by W. C. Griffin, Official Digest 28, No. 377,446 (1956), in the range of from about 8 to 10. If the produced beads or spheroidal particles are to be used as carriers for catalysts, it is preferred to use an emulsifier that has no ash content. Thus, for example, suitable emulsifiers may be the nonionics obtained by reacting ethylene oxide with aliphatic alcohols containing 8 to 18 carbon atoms, mono-alkyl phenols containing an alkyl group of 8 to 18 carbon atoms, dialkyl phenols having alkyl chains containing 4 to 7 carbon atoms each or 14 to 18 carbon atoms together, carbonic acids containing 8 to 18 carbon atoms in the chain, carbonic acid amides containing 8 to 18 carbon atoms in the chain, sulphonic acid amides containing 8 to 18 carbon atoms in the chain, or polypropylene glycols containing 6 to 24 carbon atoms, so that, in the resulting nonionics, the number of mols of ethylene oxide is between one-half and one-sixth the number of carbon atoms in the chain and, in any case, does not exceed a maximum number of 6.5 mols of ethylene oxide, on the average, and the HLB number is in the range between 8 and 10.

It is preferred that the amount of the emulsifier employed be in the range between 5 and 50 mg. per ml. of the water-immiscible liquid dispersed in the hydrosol. Further, the amount of water-immiscible liquid to be dispersed in the sol is preferably in the range between 0.1 and 1.0 cm.$^3$ per g. $Al_2O_3$ in the sol.

In each of the following specific examples which are merely illustrative, a standard apparatus was used for discharging the hydrosol in the form of drops from a hollow needle having an internal diameter of 1.5 to 1.6 mm., and into an air space having a height of 1 to 5 cm. After falling through such air space, the drops pass through an organic liquid layer having a height of 8 cm., and then enter an aqueous layer having a height of at least 5 cm. The rate at which the hydrosol was discharged from the needle was approximately 400 cm.$^3$/hour. The above mentioned hollow needle produced drops having a diameter of 3 to 4 mm. After separation from the coagulating liquid constituting the aqueous layer, the spheroidal gel particles were dried for a period of 12 to 20 hours at 60 to 80° C., and thereafter the dried particles were calcined for one-half hour at 780° C. The calcined particles had a diameter of 1.4 to 1.8 mm.

The drying of the particles was effected on a plate having the particles applied thereto in a layer of a height of 1 to 3 cm., and the calcining of the particles was effected with the particles in a layer having a height between 1 and 1.5 cm. The warming-up time for the calcining of the particles before the mentioned temperature of 780° C. was attained amounted to approximately 2 to 3 hours. The specific surface, as measured according to the BET (Brunauer, Emmett and Teller) method (J.A.C.S. 60, 309—1938), the pore volume, and the CBD of the calcined spheroidal gel particles obtained are given for each example. In all of the examples, the aqueous coagulating layer consisted of 5 percent ammonia in which there was present 0.3 percent, by weight, of p-tert.-octylphenol modified with about 10 ethylene oxide groups per mol.

The hydrosols used in the several examples were produced as follows:

HYDROSOL I

Fine ammonium alum crystals were converted topochemically in a mixture of equal parts, by volume, of 25 percent ammonia and a 40 percent ammonium sulphate solution into hydrated aluminum oxide. The hydrated aluminium oxide was washed free of sulphate ions and ammonium ions, and thereafter was peptized in acetic acid solution to form a hydrosol with a $Al_2O_3$ content of 7 percent, by weight, and an acetic acid content of 1.25 percent, by weight.

HYDROSOL II

Hydrated aluminum oxide was produced in the manner described above for the production of hydrosol I, but was peptized in hydrochloric acid, while maintaining the pH constant at 3.8. The $Al_2O_3$ content of the resulting hydrosol was 8 percent, by weight, and the hydrochloric acid content was 0.64 to 0.70 percent, by weight.

HYDROSOL III

This hydrosol was prepared by the process disclosed in U.S. Patent Reissue No. 22,196, so as to have an $Al_2O_3$ content of 9.5 to 10.0 percent, by weight, and an acetic acid content of 2.0 to 2.2 percent, by weight, with a pH of 5.0 to 5.1, whereupon approximately 14 g. ammonium acetate was added per 1 of the hydrosol to adjust the pH to a value of 6.0 to 6.1.

HYDROSOL IV

A ferric oxide hydrosol was obtained by peptizing topochemically converted iron ammonium alum with ammonia. The peptization was effected with the aid of hydrochloric acid, so that the final sol contained 11.8 percent $Fe_2O_3$ and 2 percent HCl, both by weight.

EXAMPLE I 7.5 cm.$^3$ of gas or vaporizing oil having a boiling range of 250 to 350° C. together with 50 mg. of LAEO–2.2 were dispersed in 215 g. of hydrosol I. By using the previously described process and apparatus, beads or spheroidal particles were obtained having a specific surface of 276 m.$^2$/g., a pore volume of 0.43 cm.$^3$/g. and a CBD of 0.56 g./cm.$^3$.

EXAMPLE II 17.5 cm.$^3$ of kerosene and 100 mg. of LAEO–2.2 were dispersed in 215 g. of hydrosol II, which was then subjected to the previously described process so as to obtain beads having a specific surface of 220 m.$^2$/g., a pore volume of 0.44 cm.$^3$/g. and a CBD of 0.42 g./cm.$^3$.

EXAMPLE III 10 cm.$^3$ of kerosene and 50 mg. LAEO–2.2 were dispersed in 215 g. of hydrosol III, whereupon, the hydrosol was subjected to the previously described process to obtain beads having a specific surface of 250 m.$^2$/g., a pore volume of 0.56 cm.$^3$/g. and a CBD of 0.55 cm.$^3$/g.

EXAMPLE IV 10 cm.$^3$ of kerosene containing 50 mg. LAEO–2.2 were dispersed in 315 g. of hydrosol IV, whereupon the hydrosol was subjected to the previously described process to obtain beads having a specific surface of 250 m.$^2$/g., a pore volume of 0.50 cm.$^3$/g. and a CBD of 0.9 g./cm.$^3$. In the absence of the kerosene dispersed in the hydrosol, the beads obtained had a CBD of 1.41 cm.$^3$/g.

EXAMPLE V

Kerosene together with the emulsifiers identified below were dispersed in hydrosol I in the proportions indicated in Table 4 below, whereupon the respective hydrosol dispersions were subjected to the previously described process to obtain beads having the characteristics indicated in the table.

Emulsifier 1 was polyoxyethylene monolaurate containing 4 mols ethylene oxide per mol of the compound.

Emulsifier 2 was polyoxyethylene monostearate containing 6 mols ethylene oxide per mol of the compound.

Emulsifier 3 was dodecyl phenol polyoxyethylene ether containing 4 mols ethylene oxide per mol of the compound.

Emulsifier 4 was nonyl phenol polyoxyethylene ether containing 4 mols ethylene oxide per mol of the compound.

TABLE 4

| Emulsifier | Cm.$^3$ kerosene/g. $Al_2O_3$ in sol | Mg. emulsifier/ml. kerosene | Crushing strength (kg.) | CBD (g./cm.$^3$) |
|---|---|---|---|---|
| 1 | 0.58 | 6.5 | 3.1 | 0.57 |
| 1 | 0.58 | 14.0 | 3.3 | 0.56 |
| 1 | 0.58 | 26.7 | 3.6 | 0.55 |
| 2 | 0.51 | 10.0 | 2.8 | 0.53 |
| 2 | 0.51 | 24.5 | 3.6 | 0.52 |
| 3 | 0.41 | 23.5 | 3.4 | 0.59 |
| 3 | 0.41 | 37.8 | 3.7 | 0.58 |
| 4 | 0.18 | 6.1 | 2.5 | 0.68 |
| 4 | 0.18 | 12.5 | 3.0 | 0.66 |
| 4 | 0.18 | 25.1 | 4.4 | 0.64 |

EXAMPLE VI

In the several experiements (r)–(w) which constitute this example and which are tabulated in the following Table 5, beads of $Al_2O_3$ produced by the previously described process were extracted with hydrochloric acid and then impregnated with chlorine and platinum so as to constitute reforming catalysts. For the purposes of comparison, the acid extraction of the beads was eliminated in experiment (r), and, in experiment (s), the dispersion of kerosene has been omitted from the hydrosol constituting the starting material for the production of the beads. Further, in experiment (s), the platinum content, which is by weight, has been adjusted so that the weight of platinum per volume of catalyst is the same as that for the other experiments.

TABLE 5

| Experiment | (r) | (s) | (t) | (u) | (v) | (w) |
|---|---|---|---|---|---|---|
| Hydrosol | III | III | III | II | I | I |
| Platinum, percent | 0.77 | 0.52 | 0.77 | 0.77 | 0.6 | 0.6 |
| Chlorine | 0.71 | 0.67 | 0.69 | 0.68 | 0.73 | 0.65 |
| CBD, g./cm.³ | 0.57 | 0.84 | 0.57 | 0.52 | 0.54 | 0.62 |
| Diameter, mm | 1.77 | 1.57 | 1.75 | 1.69 | 1.44 | 1.61 |
| Specific surface, m.²/g | 211 | 191 | 207 | 203 | 220 | 222 |
| Pore volume, cm.³/g | 0.59 | 0.46 | 0.61 | 0.45 | 0.53 | 0.45 |
| Pore diameter, A | 111 | 96 | 117 | 88 | 96 | 82 |
| Cm.³ kerosene/g. Al₂O₃ | 0.57 | ------ | 0.57 | 0.67 | 0.5 | 0.4 |
| Mg. LAEO-2.2/ml. kerosene | 6.7 | ------ | 6.7 | 6.7 | 6.7 | 6.7 |
| Percent Al₂O₃ extracted by acid | | 3.5 | 3.5 | 3.5 | 8.0 | 5.0 |
| Volume activity | 135 | 186 | 147 | 139 | 140 | 141 |
| Weight activity | 177 | 166 | 194 | 200 | 195 | 171 |
| Selectivity | +2.7 | +2.1 | +3.1 | +3.5 | +3.9 | +3.1 |

EXAMPLE VII 2.15 g. of molybdenum oxide ($MoO_3$–93% pure) was suspended in 7 cc. of kerosene which was dispersed, along with 50 mg. LAEO-2.2 in 200 g. of hydrosol I, whereupon the hydrosol was subjected to the previously described process to obtain beads or spheroidal particles which, after drying, as previously described, were calcined at a temperature of 600° C. The calcined beads were impregnated with a cobalt nitrate solution so as to introduce 1.8 g. CoO. After such impregnation, the beads were dried and again calcined at 600° C. The beads thus obtained contained 4 percent, by weight, of CoO and 12 percent, by weight, of $MoO_3$. Further, the resulting beads had a CBD of 0.69 g./cm.³, a diameter of 1.5 mm., a crushing strength of 1.4 kg., a specific surface of 319 m.²/g. and a pore volume of 0.39 cm.³/g.

It will be noted that, in the above description, the emulsifiers dispersed with the water-immiscible liquid in the hydrosol are all substantially water-insoluble, as water-soluble emulsifiers are not suitable for the process embodying this invention. Water-soluble emulsifiers prevent the shaping of spheroidal particles or beads as such emulsifiers would excessively decrease the surface tension between the hydrosol dispersion and the kerosene or other organic liquid into which the hydrosol in dropped.

Although specific examples of the invention have been given above, it is to be understood that the invention is not limited to those precise examples, and that various changes and modifications may be effected therein by one skilled in the art without departing from the scope or spirit of the invention as defined in the appended claims.

What is claimed is:
1. In the process for producing spheroidal particles of inorganic oxide gels by forming drops of a gelable hydrosol of at least one water-insoluble inorganic oxide and permitting said drops to fall through air into a body of a water-immiscible liquid above a body of an aqueous coagulating medium so that the hydrosol drops are formed into spheroidal globules in passing through said body of water-immiscible liquid and said spheroidal globules are coagulated to firm hydrogel particles in said coagulating medium; the improvement of dispersing in said hydrosol a water-immiscible liquid with the aid of a substantially water-insoluble emulsifier, the amount of said water-immiscible liquid is in the range between 0.1 and 1.0 cm.³ per g. of said water insoluble inorganic oxide in the hydrosol, and the amount of said water-insoluble emulsifier being in the range between approximately 5 and 50 mg. of emulsifier per ml. of said water-immiscible liquid dispersed in the hydrosol.

2. The process according to claim 1 wherein said emulsifier is soluble in said dispersed water-immiscible liquid and has an HLB-number in the range from approximately 8 to 10.

3. The process according to claim 2 wherein said emulsifier is a nonionic consisting of an ethoxylated organic compound containing polyoxy ethylene groups which are equal in number to from ½ to ⅙ of the number of carbon atoms in the chain of said organic compound.

4. The process according to claim 3 wherein said organic compound is selected from the group consisting of aliphatic alcohols having 8 to 18 carbon atoms, monoalkyl phenols having an alkyl group containing 8 to 18 carbon atoms, dialkylphenols having alkyl chains that contain 4 to 7 carbon atoms each and 14 to 18 carbon atoms together, carbonic acids and carbonic acid amides containing 8 to 18 carbon atoms, sulphonic acid amides containing 8 to 18 carbon atoms and polypropylene glycols containing 6 to 24 carbon atoms.

5. The process according to claim 1 wherein said emulsifier is selected from the group consisting of lauryl alcohol modified with 2.2 mols ethylene oxide per mol lauryl alcohol, polyoxyethylene monolaurate containing 4 mols ethylene oxide per mol of the compound, polyoxyethylene monostearate containing 6 mols ethylene oxide per mol of the compound, dodecyl phenol polyoxyethylene ether containing 4 mols ethylene oxide per mol of the compound and nonyl phenol polyoxyethylene ether containing 4 mols ethylene oxide per mol of the compound.

6. The process according to claim 1 wherein said water-immiscible liquid dispersed in the hydrosol is selected from the group consisting of kerosene, benzene, carbon tetrachloride, vaporizing oil and mixtures thereof, said emulsifier is a nonionic soluble in said dispersed water-immiscible liquid and consisting of an ethoxylated organic compound containing polyoxy ethylene groups which are equal in number to from ½ to ⅙ of the number of carbon atoms in the chain of said organic compound, and said emulsifier has an HLB-number in the range between approximately 8 to 10.

7. The process according to claim 6 wherein said water-immiscible liquid constituting said body into which the hydrosol is introduced is the same as said water-immiscible liquid dispersed in the hydrosol.

8. The process according to claim 7 wherein said hydrosol is an alumina hydrosol, said water-immiscible liquid is kerosene, and said coagulating medium is ammonia.

9. The process according to claim 6 wherein said hydrosol is an acidic aluminum oxide hydrosol containing approximately from 7 to 10%, by weight of $Al_2O_3$ and from 1.25 to 1.6%, by weight, of acetic acid, and which is medium and subjected to aicd extraction followed by impregnation with platinum and a halogen to constitute a 13. Spheroidal hydrogel particles produced by the pH in the range between 3.5 and 4.5.

10. The process according to claim 9 wherein said water-immiscible liquid forming said body into which said drops of hydrosol are introduced is selected from the group consisting of kerosene, benzene, carbon tetrachloride, vaporizing oil and mixtures thereof, and said coagulating medium contains 5%, by weight, of ammonia, and a surfactant.

11. The process according to claim 1 wherein said inorganic oxide of the hydrosol is aluminum oxide, and molybdenum oxide in finely divided form is introduced in said hydrosol along with said dispersed water-immiscible liquid and said emulsifier; and wherein the firm hydrogel particles are removed from said coagulating medium, and impregnated with a solution containing a cobalt salt to form a desulphurizing catalyst.

12. The process according to claim 1 wherein the firm hydrogel particles are removed from said coagulating medium and subjected to acid extraction followed by impregnation with platinum and a halogen to constitute a reforming catalyst.

13. Shperoidal hydrogel particles produced by the process according to claim 1.

14. Spheroidal desulphurizing catalyst particles produced by the process according to claim 11.

15. Spheroidal reforming catalyst particles produced by the process according to claim 12.

References Cited

UNITED STATES PATENTS

| | | | |
|---|---|---|---|
| 2,384,945 | 9/1945 | Marisic | 252—317 |
| Re. 22,196 | 10/1942 | Heard | 196—52 |
| 2,503,913 | 4/1950 | Kimberlin | 34—9 |
| 2,532,497 | 12/1950 | Hoekstra | 252—448 |
| 2,689,226 | 9/1954 | Hoekstra | 252—442 |
| 2,643,231 | 6/1953 | Erickson | 252—448 |

PATRICK P. GARVIN, Primary Examiner

U.S. Cl. X.R.

252—442, 448